US012084899B2

(12) United States Patent
Schiffer et al.

(10) Patent No.: US 12,084,899 B2
(45) Date of Patent: Sep. 10, 2024

(54) MOTOR VEHICLE DOOR

(71) Applicant: Kiekert AG, Heiligenhaus (DE)

(72) Inventors: Holger Schiffer, Meerbusch (DE); Michael Scholz, Essen (DE); Ömer Inan, Dorsten (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 36 days.

(21) Appl. No.: 17/998,401

(22) PCT Filed: Mar. 22, 2021

(86) PCT No.: PCT/DE2021/100281
§ 371 (c)(1),
(2) Date: Nov. 10, 2022

(87) PCT Pub. No.: WO2021/228300
PCT Pub. Date: Nov. 18, 2021

(65) Prior Publication Data

US 2023/0184009 A1 Jun. 15, 2023

(30) Foreign Application Priority Data

May 14, 2020 (DE) ..................... 10 2020 113 069.4

(51) Int. Cl.
*E05B 81/86* (2014.01)
*E05B 85/10* (2014.01)

(52) U.S. Cl.
CPC .............. *E05B 81/86* (2013.01); *E05B 85/10* (2013.01)

(58) Field of Classification Search
CPC ................................. E05B 81/86; E05B 85/10
USPC ........................................................ 307/10.1
See application file for complete search history.

(56) References Cited

U.S. PATENT DOCUMENTS 9,903,142 B2 * 2/2018 Van Wiemeersch .... E05B 81/76
2001/0019227 A1 9/2001 Girard
2004/0227356 A1 * 11/2004 Koike ..................... E05B 81/14 292/216
2017/0350170 A1 * 12/2017 Cetnar .................... E05B 77/26
2018/0044949 A1 * 2/2018 Frello ...................... E05B 77/14
2018/0340359 A1 * 11/2018 Cumbo ................... E05B 81/42
2018/0355643 A1 * 12/2018 Taurasi ................... E05B 81/16
2020/0095809 A1 * 3/2020 Yong ....................... E05B 81/06
(Continued)

FOREIGN PATENT DOCUMENTS

DE 69509317 T2 8/1999
DE 102012018452 A1 3/2014
DE 112013000504 T5 10/2014
(Continued)

OTHER PUBLICATIONS

International Search Report mailed Jul. 15, 2022, for priority International Patent Application No. PCT/DE2021/100281.

*Primary Examiner* — Alfonso Perez Borroto
(74) *Attorney, Agent, or Firm* — Renner, Otto, Boisselle & Sklar, LLP

(57) ABSTRACT

A motor vehicle door equipped with a motor vehicle door lock, as well as with at least one first electromotive drive for the motor vehicle door lock, and with an emergency electrical power source for the first drive. According to the invention, the emergency power source is arranged in a component required for operation, for attaching in or to a door leaf.

15 Claims, 2 Drawing Sheets

(56) References Cited

U.S. PATENT DOCUMENTS

2020/0190861 A1 * 6/2020 Margheritti ............. E05B 85/26

FOREIGN PATENT DOCUMENTS

| | | | |
|---|---|---|---|
| DE | 202014105458 | U1 | 11/2014 |
| DE | 102013020423 | A1 | 6/2015 |
| DE | 102014105872 | A1 | 10/2015 |
| DE | 102015205951 | A1 | 10/2016 |
| DE | 202016105621 | U1 | 11/2016 |
| DE | 102018100551 | A1 | 7/2019 |
| DE | 102018120447 | A1 | 2/2020 |
| EP | 3020892 | A1 | 5/2016 |

* cited by examiner

MOTOR VEHICLE DOOR

This application is a national phase of International Patent Application No. PCT/DE2021/100281 filed Mar. 22, 2021, which claims priority to German Patent Application No. 10 2020 113 069.4 filed May 14, 2020, each of which is hereby incorporated herein by reference in its entirety.

FIELD OF DISCLOSURE

The invention relates to a motor vehicle door with a motor vehicle door lock, as well as with at least one first electromotive drive for the motor vehicle door lock, and to an electrical emergency power source for the relevant or first drive.

BACKGROUND OF DISCLOSURE

The electromotive drive for the motor vehicle door lock generally ensures that the motor vehicle door lock in question can be opened electrically. This requires that the electromotive drive is energized from, for example, a main power source inside an associated motor vehicle body. This corresponds to normal operation. In addition, however, there is also an emergency operation, specifically in the event that the main power source is not available. This can be the case when the main power source is quite simply drained. However, emergency operation is also possible in cases when the electrical connection from the electromotive drive to the main power source is interrupted, for example in the event of an accident or crash.

The term motor vehicle door is to be interpreted broadly within the scope of the invention. This includes, among other things, motor vehicle side doors, motor vehicle sliding doors, but also motor vehicle tailgates, motor vehicle charging flaps, etc. Therefore, all motor vehicle doors or motor vehicle flaps are ultimately covered on or in the motor vehicle. As a rule, this includes in particular motor vehicle side doors, which are electrically opened for reasons of comfort or are also equipped with a closing drive, and which enable an operator to access the interior of the motor vehicle and thus operation thereof.

In the prior art, there are already various approaches as to how to manage such an emergency operation. Thus, DE 20-2016-105 621 U1 deals with a keyless access and ignition system for vehicles. In this context, among other things, a reserve module is addressed for supplying a lock with the required electrical energy with the aid of a reserve power supply. The reserve module can be mounted at a suitable location, for example in an interior of a door leaf of the motor vehicle door in question. In addition, the design is such that the reserve module is accessible by removing an outer screen in order to enable the replacement or also the maintenance of the reserve module. Furthermore, the replacement of the reserve power supply or emergency power source should thus to be made possible, if this is necessary. For this purpose, the reserve module is additionally provided in or on the motor vehicle door leaf.

The further prior art according to DE 10 2018 100 551 A1 relates to a motor vehicle closing device. This has an electrically drivable actuator which is configured at least for unlocking or opening a motor vehicle door. Furthermore, an emergency actuation device for the motor vehicle door in question is provided. The emergency actuation device is functionally and structurally independent of the motor vehicle and has an external power source for the actuator. The external power source can represent a component of a mobile device. In addition, an energy interface is provided, by means of which the external power source can be connected to the actuator. The energy interface can operate in a contactless or contacting manner. In addition, the energy interface is usually arranged on the outside at an accessible location of the motor vehicle, for example in the exterior mirror or also in the outer door handle or also on a door panel of an associated motor vehicle door. Such an attachment location is problematic at least when the motor vehicle has significant contamination or damage in the region of the energy interface caused by an accident.

DE 11-2013-000 504 T5 discloses a vehicle access system which has, among other things, an external power supply. The external power supply can be charged via an energy transmission means. As a result, an emergency power source is available for supplying energy to an authentication device, a controller and the electrical locks.

Finally, DE 10-2015-205 951 A1 deals with an electric lock with an actuating device for a motor vehicle lock. Various variants are conceivable in order to be able to open a locking mechanism as a component of the motor vehicle door lock at this point with a sufficiently large force without having to provide an excessively large electric motor for this purpose. A second electric drive can thus be actuated if the opening of the locking mechanism with the aid of the first electric drive has not succeeded. For this purpose, the second electric drive is dimensioned to be greater than the first electric drive. For this reason, the second electric drive can also operate as a closing aid or function as such. In this way, the locking mechanism as a component of the motor vehicle door lock is to be acted upon with much larger forces than in normal operation in extreme cases or under unfavorable weather conditions. In emergency operation, the same also applies when the motor vehicle door has been deformed by an accident.

In this context, it is also provided that the associated actuating device comprises a drive wheel, wherein by rotating the drive wheel in a first direction an opening first force can be introduced into the locking mechanism. When the drive wheel is rotated in the opposite second direction, a second force, which is increased in comparison thereto, can be introduced into the locking mechanism. In this context, a larger transmission ratio is also conceivable.

The prior art has proven successful in principle when it comes to generally providing emergency operation. This emergency operation can be necessary if the main power source inside the motor vehicle body has failed. This may be caused by discharging or an accident. Various approaches are pursued in the prior art. Thus, DE 10-2015-205 951 A1 already provides different drives for normal operation and emergency operation. In this case, different transmission ratios can also be used. When the generic DE 10-2018-100 551 A1 is considered, it is apparent that the emergency operation or the supply of the emergency power source via the energy interface thereat requires the absence of damage. Finally, DE 20-2016-105 621 U1 describes a separate and self-contained reserve module which has to be attached in the interior of the motor vehicle door or the door leaf and is generally accessible via a cover.

SUMMARY OF DISCLOSURE

However, all these approaches are capable of improvement, in particular the last mentioned variant. This is because the reserve module provided at this point requires a special design and attachment in the interior of the door panel. This is not only structurally complex but also requires the availability of sufficient installation space in the door leaf for the reserve module in question. Nowadays, however, attempts are being made on the one hand to keep the weight of any inserts or installation parts as low as possible. On the other, the installation space available in the interior of the door leaf is limited because in this region, units such as window lifters, side airbag, loudspeakers, etc., which are increasingly regarded as being mandatory, require a part of this space. No convincing solutions have been available for this purpose.

Accordingly, the technical problem to be solved by the present invention is to further develop such a motor vehicle door in such a way that a solution can be provided which is optimized with regard to the observed production costs and the required installation space.

In order to solve this technical problem, with a generic motor vehicle door within the scope of the invention, the invention proposes that the emergency power source is arranged in an operationally required component for attachment in or on a door leaf.

In the context of the invention and contrary to the teaching according to DE 20-2016-105 621 U1, the emergency power source is therefore expressly not part of a separate reserve module. Rather, the emergency power source is integrated into a mandatory component. As a result, inter alia and generally, a separate housing for the emergency power source is dispensed with, because the latter is located and arranged inside the component which is in any case required. This component is a component that is required in terms of operation, that is to say one which is mandatory and indispensable overall for the intended operation of the door leaf and thus of the motor vehicle door.

For this purpose, the component can advantageously be an outer door handle and/or an inner door handle. If the motor vehicle door is designed, for example, as a front motor vehicle side door, the emergency power source can alternatively or additionally also be mounted in the outer door mirror.

A further advantageous design of the component provides that this is designed as a motor vehicle door lock. In this case, the emergency power source can be housed, for example, in the lock housing for the motor vehicle door lock that is already provided in this position. Alternatively or additionally, the component can also be designed as a control unit. Such a control unit is generally found in any motor vehicle door or inside the associated door leaf, namely to control the motor vehicle door lock, optionally the window lifter, a side airbag, etc. In this case too, the required housing for receiving the control unit is also available or used in the context of the invention as a housing for the emergency power source.

A further variant which is used additionally or alternatively is that the component required for operation is designed for attachment in or on the door leaf as a window lifter, a loudspeaker, an airbag, etc. This means, in this case, that the emergency power source can be integrated into the mandatory window lifter or its housing. An integration of the emergency power source into the loudspeaker, the airbag or side airbag, etc. is equally possible and is covered by the invention.

All these mounting locations of the emergency power source, which are shown by way of example, make it clear that no separate housing and also no separate electrical power supply of the emergency power source are required within the scope of the invention. Rather, the emergency power source uses the one or more components required in terms of operation for attachment in or on the door leaf. This means that according to the invention, it is also possible to divide the emergency power source into different subunits, which are placed and arranged in operationally required components, which deviate and are different from one another, for attachment in or on the door leaf. For example, it is conceivable for a part of the emergency power source to be accommodated in a space in the outer door handle, while the other part of the emergency power source is arranged in the interior of the control unit. As a result, the emergency power source can be equipped with the required energy storage capacity in order to provide an electrical opening of the motor vehicle door lock in any case during emergency operation.

For example, the electrical emergency power source can be a conventional rechargeable battery. In general, however, so-called "supercaps" are used here, i.e. capacitors with a particularly high capacity. In this case, the one or more capacitors—as described—can be distributed for example on the outer door handle or also on the control unit or several other of the components required in terms of operation, for attachment in or on the door leaf. Of course, it is also possible to concentrate the emergency power source only in or on one of these components.

Since the previously mentioned operationally required components all generally have an electrical power supply, it is simultaneously ensured via this already provided electrical power supply that the emergency power source is supplied with the required charging current during normal operation. This is all successfully accomplished while also taking into account a compact and cost-effective structure, which has no precedent in the prior art.

According to an advantageous embodiment, a second electromotive drive for the motor vehicle door lock can be provided in addition to the first electromotive drive. In this case, the design is usually such that the first electromotive drive is supplied by the main power source. In contrast, the second electromotive drive is supplied only by the emergency power source. However, it is also possible for both the first electromotive drive and the second electromotive drive to be supplied by the main power source during normal operation and by the main power source and the emergency power source during emergency operation.

In addition, the design in this case is usually such that the first electromotive drive ensures a rapid actuation of the locking mechanism of the motor vehicle door lock and thus a rapid opening. For this purpose, a low torque is usually required in normal operation. In contrast, the second electromotive drive provides a much higher torque in emergency operation in order to be able to electrically open the door leaf in question in the event of a possible deformation after a crash. Here, it is not important to ensure a rapid opening of the locking mechanism of the motor vehicle door lock, but rather the opening can also take place slowly as long as the electrical opening is ensured at all via the increased torque on the part of the second drive.

In this context, a further variant provides that the first electromotive drive has a transmission which operates on the locking mechanism of the motor vehicle door lock during emergency operation. That is to say, in normal operation, the electromotive drive acts directly on the locking mechanism in question without the transmission and ensures a fast opening of the motor vehicle door lock. In contrast, in emergency operation or exclusively in emergency operation, the transmission following the electromotive drive is used, which in this case ensures that the locking mechanism is acted upon with increased torque in emergency operation compared to normal operation.

In the context of a further variant, it can also be provided at this point that the first electromotive drive is equipped with a manual transmission with at least two shifting stages. In normal operation, a first shifting stage of the manual transmission downstream of the electromotive drive ensures that the locking mechanism is opened quickly. For this purpose, the first shifting stage provides a relatively low torque and is equipped for fast running, i.e. generally with a gear ratio. In contrast, the second stage is used in emergency operation. The second shifting stage generally causes a reduction ratio of the electromotive drive to provide the required increased torque to open the locking mechanism in emergency operation.

In all these cases, the design is generally such that the main power source supplies the first electromotive drive during normal operation. This means that in the variant with the two drives, the main power source ensures electrical supply of the first drive. Likewise, the first shifting stage in normal operation is used in the variant in which the first electromotive drive is necessarily provided with the manual transmission.

However, if emergency operation occurs, this emergency operation ensures that the second electromotive drive is supplied by the emergency power source in the variant with two drives. Likewise, the emergency operation with the emergency power source ensures that the transmission previously not used in normal operation, in the other variant with only one first electromotive drive, generally reduces the rotational speed of the electromotive drive in order to provide the increased torque on the output side for opening the locking mechanism of the motor vehicle door lock in emergency operation. Finally, the emergency operation ensures that the second shifting stage of the transmission is used, wherein the first electromotive drive is energized in this case with the aid of the emergency power source.

In order to precisely implement this described shifting between normal operation and emergency operation, a load switch is generally provided. With the aid of the load switch, the emergency power source is electrically connected to the associated first or second drive in emergency operation. In addition, the design is usually such that the load switch is actuated in accordance with an activation signal. The activation signal switches between normal operation and emergency operation and ensures that the emergency power source is electrically connected to the electromotive drive via the load switch that is then closed.

For this purpose, the signal of an existing and required crash sensor can be evaluated as an activation signal, for example. The crash sensor is known to serve to detect excessive negative accelerations, i.e. decelerations of generally more than 5 g. Depending on a signal of the crash sensor, safety systems such as airbags, side impact protection, belt tensioners etc. are generally activated. Within the scope of the invention, the signal of the crash sensor is additionally used as an activation signal for actuating the load switch, so that in this way the emergency power source is available for power supply, even if, as a result of the crash, the main power source does not supply or no longer supply sufficient electrical energy. In addition, the activation signal ensures the activation of the transmission or the shifting into the second shifting stage. Herein lie the substantial advantages.

BRIEF DESCRIPTION OF DRAWINGS

The invention is explained in greater detail below with reference to a drawing which shows only one exemplary embodiment. In particular.

DETAILED DESCRIPTION

Figure 1:
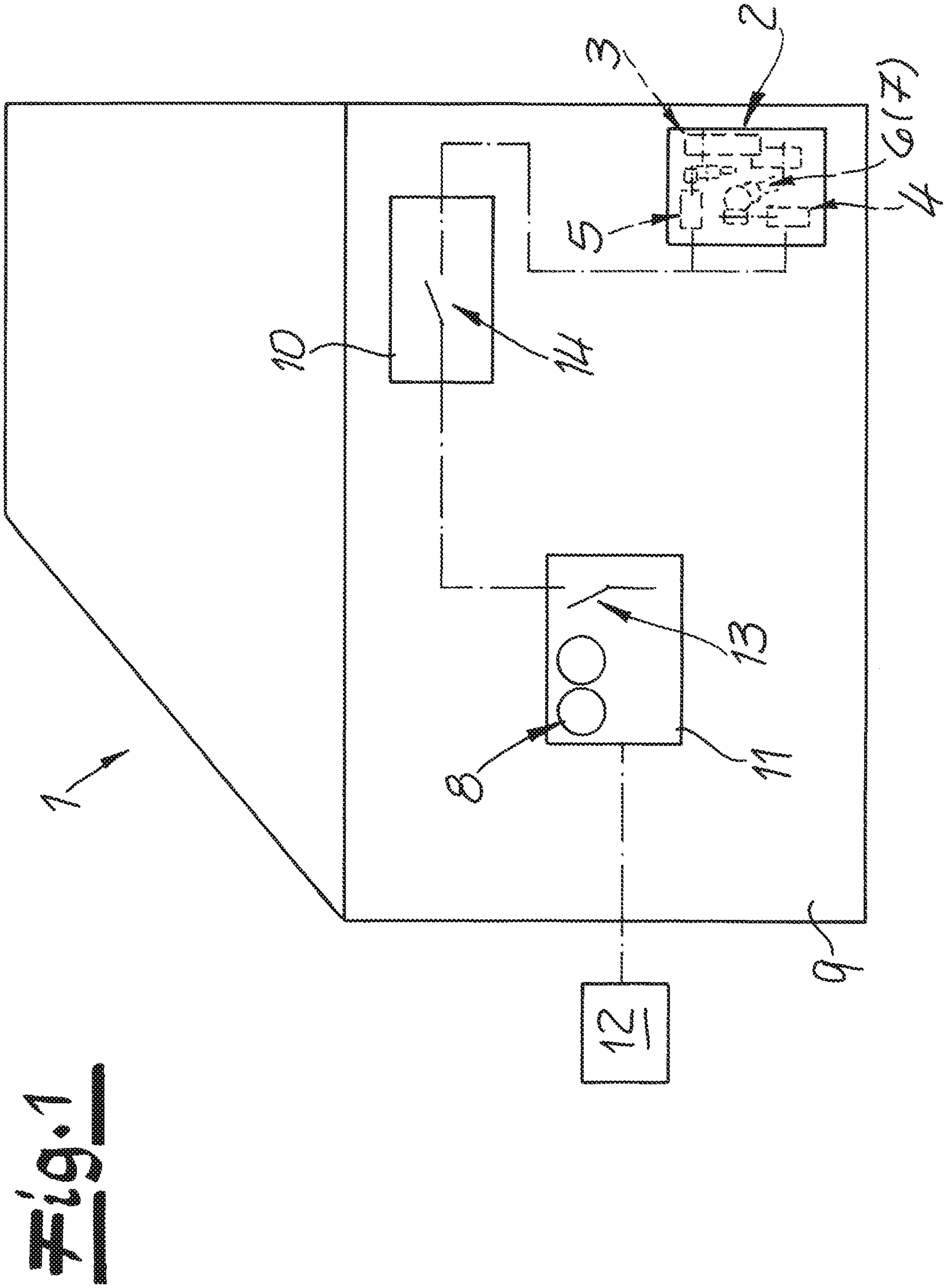
FIG. 1 schematically shows the motor vehicle door according to the invention and FIGS. 2A-2C show different variants of the electromotive drive for the associated motor vehicle door lock.

In the drawings, a motor vehicle lock is shown, which, in a non-limiting way, is a motor vehicle door lock 1 within the scope of the exemplary embodiment. The motor vehicle door or motor vehicle side door 1 has a motor vehicle door lock 2, which is equipped with a mandatory locking mechanism 3 composed of a rotary latch and pawl. In addition, a first electromotive drive 4 for the motor vehicle door lock 2 or its locking mechanism 3 is provided. The electromotive drive 4 is located inside a housing of the motor vehicle door lock 2.

Figure 2:
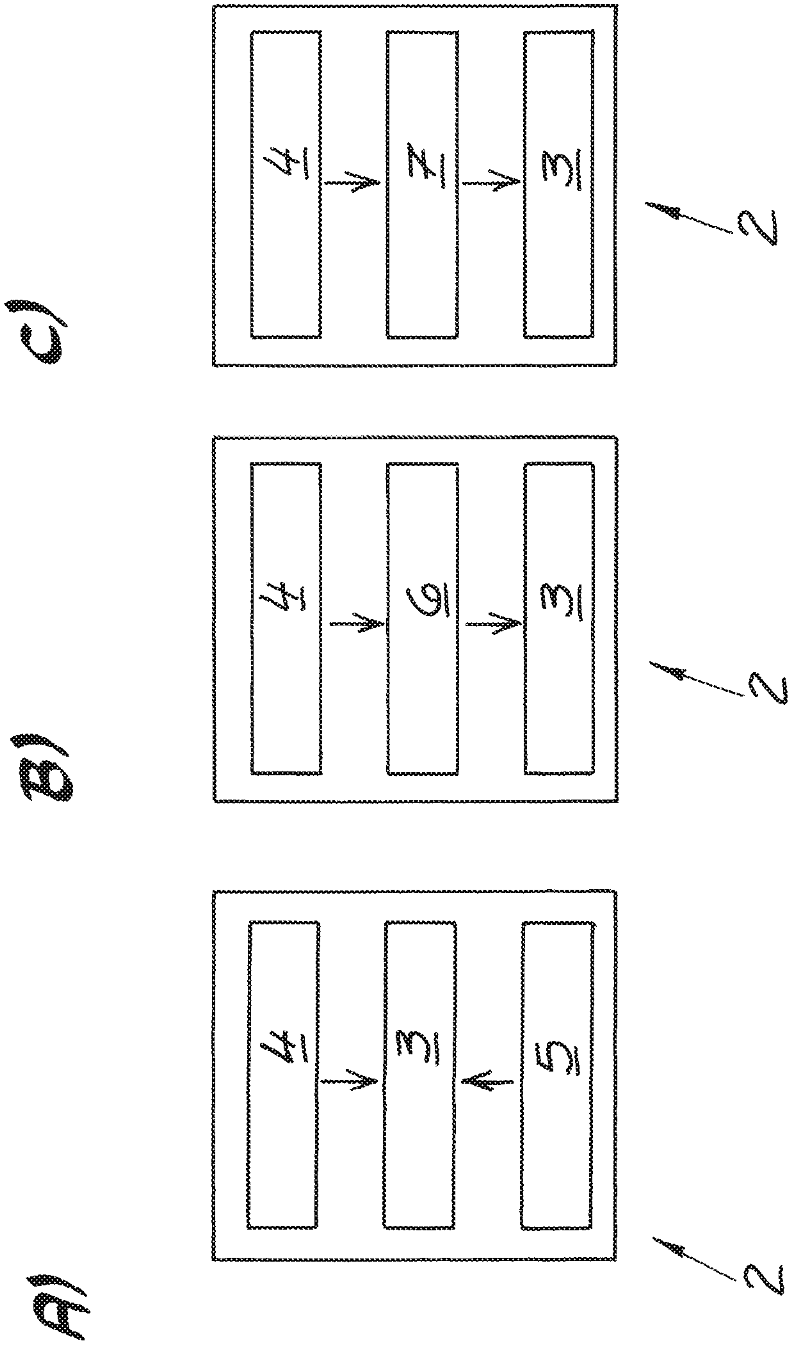

In addition to the first electromotive drive 4, a further second electromotive drive 5, which also operates on the locking mechanism 3, can be seen in the variant of the motor vehicle door lock 2 according to the illustration in FIG. 2A. The variant according to FIG. 2B is also equipped with a transmission 6 downstream of the electromotive drive 4. Finally, in the further variant according to FIG. 2C, the motor vehicle door lock 2 engages a manual transmission 7 downstream of the electromotive drive 4, with the aid of which the locking mechanism 3 can be acted upon.

An electrical emergency power source 8 is also part of the basic structure of the motor vehicle door or motor vehicle side door 1 in the example. With the aid of the electrical emergency power source 8, the electromotive drive 4, 5 can be supplied, as will be explained in more detail below. For this purpose, the electrical emergency power source 8 in the context of the exemplary embodiment is composed of one or more so-called "supercaps", i.e. capacitors with a particularly high capacitance. The emergency power source 8 can completely or partially assume the function of a main power source 12 arranged in the interior of the motor vehicle body (not shown) and only indicated in FIG. 1.

In the example, the motor vehicle door or motor vehicle side door 1 is equipped with a door leaf 9, which can be opened and closed with the aid of a door handle 10 or outer door handle 10 relative to the motor vehicle body (not shown in more detail). Finally, a control unit 11 is also shown in the door leaf 9. The control unit 11 is used to control any safety systems arranged inside the door leaf 9, a window lifter and the door lock 2. Like the motor vehicle door lock 2 according to the exemplary embodiment, the control unit 11 is supplied with the required electrical energy during normal operation by the main power source 12.

Furthermore, and according to the invention, the emergency power source 8 is arranged in an operationally required component 2, 10, 11 for attachment in or on the door leaf 9. The operationally required component 2, 10, 11 for the motor vehicle door 1 is, in the context of the exemplary embodiment, the motor vehicle door lock 2, the outer door handle 10 and finally the control unit 11. That is, these components 2, 10, 11 are strictly required for the intended operation of the door leaf 9 and consequently of the motor vehicle door 1. In addition, such operationally required components 2, 10, 11, can also in principle include further components such as a window lifter, loudspeaker, airbag, door exterior mirror, inner door handle, etc., as has been explained in the introductory description.

Based on the illustration and the exemplary embodiment according to FIG. 1, it can be seen that the emergency power source 8 is arranged in the operationally required component 2, 10, 11 for attachment in or on the door leaf 9, specifically in the control unit 11. In general, the emergency power source 8 can alternatively or additionally also be mounted in the outer door handle 10 in the motor vehicle door lock 2. However, this is not shown in detail. In any case, the emergency power source 8 uses the component 2, 10, 11 in question which is required in any case in terms of operation, for its attachment, wherein a housing, which is usually mandatory in this context, additionally ensures protection of the emergency power source 8 in question against environmental influences. The emergency power source 8 is charged in normal operation via the electrical connection of the control unit 11 to the main power source 12.

The control unit 11 can now switch between normal operation and emergency operation. In normal operation, the control unit 11 is supplied with the required electrical energy with the aid of the main power source 12. The same applies to the outer door handle 10 and in particular the motor vehicle door lock 2 and the electromotive drive 4 located in the interior of the motor vehicle door lock 2. However, if emergency operation occurs, the emergency power source 8 regularly ensures the electrical supply. For this purpose, the control unit 11 receives an emergency activation signal 13 which can originate, for example, from a crash sensor, according to the introductory explanations. This indicates a schematic switch shown in FIG. 1.

As long as the emergency activation signal 13 is not active, the switch in question is open. The schematic switch in the control unit 11 is only closed, and in turn ensures that a load switch 14 connected to the control unit 11 is likewise closed, when a crash is observed and the crash sensor accordingly outputs a corresponding signal. For this purpose, the load switch 14 is located in the interior of the outer door handle 10, but can in principle also be arranged at another location in the interior of the door leaf 9. In any case, the load switch 14 becomes active only when the control unit 11 has received the emergency activation signal 13, for example as a result of a crash, and accordingly switches from normal operation to emergency operation.

As a result, the emergency power source 8 now ensures the electrical power supply of the door lock 2. In the event of a crash, the connection of the control unit 11 to the main power source 12 indicated in FIG. 1 is generally interrupted. In principle, however, the main power source 12 can also provide or ensure at least in part the further electrical power supply of the control unit 11 as well as of the outer door handle 10 and the motor vehicle door lock 2 in case of emergency.

FIGS. 2A-2C show three different variants of the motor vehicle door lock 2 according to the invention. In the variant according to FIG. 2A, the first electromotive drive 4 operates on the locking mechanism 3 during normal operation and ensures at this point that the locking mechanism 3 can be opened quickly. For this purpose, in the example, the first electromotive drive 4 provides a relatively low torque which is sufficient for this purpose in normal operation. The first electromotive drive 4 is thereby supplied with the required electrical energy with the aid of the main power source 12.

However, if emergency operation occurs, the second electromotive drive 5 is activated, which can in principle also be used in normal operation, for example as a closing drive in the interior of the motor vehicle door lock 2. The second electromotive drive 5 is regularly supplied with the required electrical energy by means of the emergency power source 8. In order to also provide a perfect opening of the locking mechanism 3, also in this case, in emergency operation, the second electromotive drive 5 operates with high reduction ratio and usually relatively slowly, so that a possibly deformed door leaf 9 can also be opened with the aid of the second electromotive drive 5.

In the variant according to FIG. 2B, it is provided that the first or only electric motor drive 4 there operates directly, i.e. without the interposed transmission 6, on the locking mechanism 3 during normal operation. The main power source 12 again ensures the electrical power supply of the electromotive drive 4. The locking mechanism 3 is again opened quickly and with relatively low torque. In contrast, if emergency operation occurs, the transmission 6 is switched on. In this case, the electric motor drive 4 is regularly supplied with the required electrical energy with the aid of the emergency power source 8. By means of the transmission 6 which is then interposed, the electromotive drive 4 generally operates with a reduction ratio on the locking mechanism 3, so that the locking mechanism 3 can still be opened slowly and with an increased torque in comparison to normal operation, even in emergency operation.

The variant of the motor vehicle door lock 2 according to FIG. 2C works similarly to the variant according to FIG. 2B. In this case too, a transmission is arranged downstream of the electromotive drive 4, this time a manual transmission 7 with two shifting stages or a manual transmission. In normal operation, the electromotive drive 4 acts on the locking mechanism 3 via the first shifting stage. This corresponds to the desired fast low torque opening in normal operation. If, on the other hand, emergency operation and supply of the electromotive drive 4 with the aid of the emergency power source 8 occur, it is switched into the second shifting position, which in this case generally ensures a reduction of the electromotive drive 4 and the application of increased torque on the locking mechanism 3 compared to normal operation.

As already explained, after receiving the emergency actuation signal 13, the control unit 11 ensures that the emergency power source 8 can supply the motor vehicle door lock 2 with the required electrical energy via the load switch 14, which is then closed. At the same time, in the exemplary embodiment, the control unit 11 ensures that, in the variant according to FIG. 2A, a switchover takes place from the first electromotive drive 4 to the second electromotive drive 5. In the variant according to FIG. 2B, the control unit 11 also ensures that the transmission 6 is switched on during emergency operation. In the variant according to FIG. 2C, the control unit 11 finally ensures that a switchover takes place from the first shifting stage in normal operation to the second shifting stage of the transmission 7 during emergency operation.

LIST OF REFERENCE NUMERALS 1 motor vehicle door or motor vehicle side door
2, 10, 11 component
2 motor vehicle door lock
10 door handle or outer door handle
11 control unit
3 locking mechanism
4 first electromotive drive
5 second electromotive drive
6 transmission
7 transmission with two shifting stages or manual transmission
8 emergency power source
9 door leaf
12 main power source

13 emergency activation signal
14 load switch

The invention claimed is:

1. A motor vehicle door, comprising:

a motor vehicle door lock, a first electromotive drive for driving the motor vehicle door lock, an operationally required component of the motor vehicle door for attachment in or on a door leaf of the motor vehicle door that is separate and distinct from the motor vehicle door lock, wherein the component includes a housing separate from a housing of the motor vehicle door lock, and an electrical emergency power source for the first electromotive drive, wherein the emergency power source is arranged in the housing of the component.

2. The motor vehicle door of claim 1, wherein the component is at least one of an outer door handle, an inner door handle, and an outer door mirror.

3. The motor vehicle door of claim 1, wherein the component is designed as a control unit.

4. The motor vehicle door of claim 1, wherein the component is designed as one of a window lifter, a speaker, or an airbag.

5. The motor vehicle door of claim 1, further comprising a second electromotive drive for driving the motor vehicle door lock.

6. The motor vehicle door of claim 1, wherein the first electromotive drive has a transmission which acts on a locking mechanism of the motor vehicle door lock during emergency operation.

7. The motor vehicle door of claim 1, wherein the first electromotive drive has a manual transmission comprising a first shifting stage that is used in normal operation and a second shifting stage that is used in emergency operation.

8. The motor vehicle door of claim 1, further comprising a load switch which electrically connects the emergency power source to the first electromotive drive in emergency operation.

9. The motor vehicle door of claim 8, wherein the load switch is actuated in accordance with an emergency activation signal.

10. The motor vehicle door of claim 5, further comprising a load switch which electrically connects the emergency power source to an associated one of the first electromotive drive or the second electromotive drive in emergency operation.

11. The motor vehicle door of claim 1, wherein the electrical emergency power source comprises a plurality of different subunits, and each of the plurality of different subunits is arranged on a respective different operationally required component of the motor vehicle door for attachment in or on the door leaf of the motor vehicle door.

12. The motor vehicle door of claim 1, wherein the electrical emergency power source comprises one or more capacitors.

13. The motor vehicle door of claim 5, wherein second electromotive drive provides a higher torque as compared to the first electromotive drive.

14. The motor vehicle door of claim 7, further comprising a crash sensor that generates an activation signal to switch from operation of the first shifting stage to operation of the second shifting stage.

15. The motor vehicle door of claim 1, wherein the component is electrically connected to a main power source such that the main power source provides electrical power to the component, and wherein the main power source is further configured to provide electrical power to the emergency power source to charge the emergency power source via the electrical connection to the component.

* * * * *